United States Patent [19]

White et al.

[11] Patent Number: 5,708,790
[45] Date of Patent: Jan. 13, 1998

[54] VIRTUAL MEMORY MAPPING METHOD AND SYSTEM FOR ADDRESS TRANSLATION MAPPING OF LOGICAL MEMORY PARTITIONS FOR BAT AND TLB ENTRIES IN A DATA PROCESSING SYSTEM

[75] Inventors: Steven W. White; G. Jeanette McWilliams, both of Austin; Jack Wayne Kemp, Round Rock, all of Tex.

[73] Assignee: International Business Machines Corporation, Armonk, N.Y.

[21] Appl. No.: 570,957

[22] Filed: Dec. 12, 1995

[51] Int. Cl.$^6$ ............... G06F 12/00; G06F 12/02; G06F 9/26; G06F 9/32
[52] U.S. Cl. ............... 395/413; 395/417; 395/418; 395/419; 395/421.1
[58] Field of Search ............... 395/413, 416, 395/417, 418, 419, 410, 421.1, 412

[56] References Cited

U.S. PATENT DOCUMENTS

| | | | |
|---|---|---|---|
| 4,754,394 | 6/1988 | Brantley, Jr. et al. | 395/405 |
| 4,855,900 | 8/1989 | Simpson et al. | 395/850 |
| 5,058,003 | 10/1991 | White | 395/419 |
| 5,109,485 | 4/1992 | Smith, Jr. | 395/200.08 |
| 5,117,350 | 5/1992 | Parrish et al. | 395/401 |
| 5,210,844 | 5/1993 | Shimura et al. | 395/480 |
| 5,442,766 | 8/1995 | Chu et al. | 395/414 |
| 5,450,558 | 9/1995 | Ludwig | 395/418 |
| 5,535,351 | 7/1996 | Peng | 395/417 |

*Primary Examiner*—Robert W. Downs
*Assistant Examiner*—Than V. Nguyen
*Attorney, Agent, or Firm*—Richard A. Henkler; Brian F. Russell; Andrew J. Dillon

[57] ABSTRACT

A method and system for address translation mapping of logical partitions for address translation buffer entries in a data processing system is provided. The method comprises receiving a logical address for a memory reference to a selected logical partition of a plurality of logical partitions of a particular block of virtual memory, wherein the block of virtual memory is divided into the plurality of logical partitions, and wherein the logical address includes a plurality of logical partition selection bits selecting the selected logical partition from among the plurality of logical partitions. If the selected logical partition is valid in real memory, as indicated by a logical partition valid bit associated with the selected logical partition, a physical address for the memory reference in the selected logical partition is compiled from an entry of an address translation buffer that is associated with the particular block of virtual memory, wherein the logical partition valid bit is one of a plurality of logical partitions valid bits contained in the entry associated with the particular block of virtual memory, the plurality of logical partition valid bits being associated with the plurality of logical partitions. Thereafter, the memory reference within the selected logical partition is retrieved at the compiled physical address.

22 Claims, 2 Drawing Sheets

VIRTUAL MEMORY MAPPING METHOD AND SYSTEM FOR ADDRESS TRANSLATION MAPPING OF LOGICAL MEMORY PARTITIONS FOR BAT AND TLB ENTRIES IN A DATA PROCESSING SYSTEM

CROSS-REFERENCE TO RELATED APPLICATION

The present application is related to U.S. Pat. Application Ser. No. 08/571,066, entitled "Virtual Memory Mapping Method and System For Memory Management Of Pools Of Logical Partitions For BAT And TLB Entries In A Data Processing System", filed herewith by the Inventors hereof and assigned to the assignee herein.

BACKGROUND OF THE INVENTION

1. Technical Field

The present invention relates in general to a virtual memory mapping system in a data processing system, and in particular to an improved virtual memory mapping system in a data processing system having cached address translation mapping of memory references. Still more particularly, the present invention relates to an improved virtual memory mapping system in a data processing system having fine granularity of cached address translation mapping of memory blocks.

2. Description of the Related Art

A computer system typically includes a processor coupled to a hierarchically staged storage system. The computer's hierarchy of storage devices comprises primary memory that includes internal components such as the CPU registers, cache memory, and main memory, and secondary memory that includes any external storage devices such as disks or tapes. Main memory is typically a DRAM or a SRAM. Computers often use an intermediate high-speed buffer called a cache memory that resides between the external devices and main memory or between main memory and the CPU. Cache memories speed up the apparent access times of the slower memories by holding the words that the CPU is most likely to access. The hardware can dynamically allocate parts of the memory within the hierarchy for addresses deemed most likely to be accessed soon.

Most computers use a multilevel storage system that operates as a virtual memory. In such systems, most programs are stored on an external device, such as a hard disk. In practice, the logical-address space of many computers is much larger that their physical-address space in main memory. For example, if a byte-addressed computer uses a 32-bit address, its logical address space has $2^{32}$ memory locations, which is four gigabytes (GB). The operating system loads the program into the main memory in parts or pages, as demanded for execution. By using virtual memory paging, the computer loads into main memory only those parts of a program that it currently needs for execution. The remainder of the program resides in external storage until needed. Thus, one of the biggest advantages of virtual memory is that because programs are stored on secondary storage devices, the size of a program that may be executed is limited not by the size of main memory but rather by the size of the computer's logical-address space.

Because various blocks of memory may be stored throughout the memory hierarchy, a program's logical addresses to particular instructions or data may no longer correspond to the physical addresses for the particular block of memory containing those instructions or data. In a virtual memory system, the operating system maintains special tables that keep track of where each part of the program resides in main memory and in external storage. The memory map between logical-address space and physical-address space is maintained in a page frame or block table having a plurality of entries, each table entry holding information about a specific page or block of memory. Thus, the CPU uses address translation mapping from the tables to translate the program's effective (or logical) addresses into their corresponding physical addresses. Most virtual memory systems keep these translation tables in main memory, and maintain a translation table base register that points to the translation table in memory. Depending upon the configuration, separate tables may exist for the block table and the page frame table.

Virtual memory hardware divides logical addresses into two parts—the virtual block (page) number (the high-order bits), and the word offset (the low-order bits). The virtual block (page) number serves as an offset into the block (or page frame) table. Therefore, when the system loads a block (or page) into memory, it always places the block beginning at a block boundary. A typical table entry includes a validity bit, which indicates whether the block is in main memory, a dirty bit, which indicates whether the program has modified the block, protection bits, which indicate which users may access the page or block of memory and how, and the page-frame or real block number (i.e., the physical address) for the block of memory, if the block (or page) is in main memory.

To minimize the amount of time required to translate a virtual address to a real address, virtual memory mapping generally uses address translation buffers to cache information for recently translated pages. Each entry of an address translation buffer holds a real block number and the same information contained in the translation table, including the validity bit for the block, one or more dirty bits, protection bits, and the virtual block number to provide the map of the virtual block number to the real block number. In paging virtual memory systems, this address translation buffer is called a translation lookaside buffer (TLB). In addition, some virtual memory systems provide an additional address translation buffer called a block address translation (BAT) buffer, which includes an additional field indicating the size of the block of memory mapped by the entry to support variable sized blocks.

In operation, whenever the CPU generates an effective address, it is sent to the TLB and the BAT, which produce the real page frame or BAT block number, if either buffer holds an entry for the referenced block of memory. If one of the address translation buffers has an entry for the reference, the effective address is translated into the physical address by concatenating the real block number held in the entry with the word offset of the effective address. If the TLB or BAT has no entry for the referenced block of memory, the hardware (or software) consults the translation table in main memory by using the virtual block number as an offset into the translation table. If the validity bit for the entry in the translation table indicates the block is in memory, the hardware copies the translation table entry and uses the real block number to access the memory into the TLB. Otherwise, the hardware initiates a trap called a page or BAT block fault, at which point the operating system intervenes to load the demanded block of memory into main memory and updates the translation table and address translation buffers. A block or page fault is an exception that instructs the operating system to load into main memory the requested or demanded block or page and to update the memory map.

In many systems, the page size is 4 kilobytes (4 KB) and there are 256 or fewer TLB entries. Consequently, the maximum amount of real storage covered by cached page translation information is often 1 MB or less. Consequently, it is unlikely that TLBs for 4 KB pages will ever cover significant portions of large (512 MB-4 GB) main memories. These TLBs are even inadequate to prevent significant performance degradation due to TLB misses while accessing data which fits in a large (4 MB-16 MB) Level Two (L2) cache. As real memory capacities, program footprints, and user working sets continue to grow, it is beneficial to increase the amount of real memory covered by cached translation information. Three common approaches to increasing the coverage are 1) increasing the number of TLB entries, 2) supporting larger pages, and 3) adding BAT facilities to augment the TLBs.

Increasing the number of TLB entries becomes expensive, both in terms of chip area and time to search for a match. Increasing the page size to 1 MB is one way to allow a limited number (64–256) of TLB entries to cover not only the L2 cache but large portions of main memory; however, the larger granularity of storage blocks and memory mapping creates great inefficiencies.

BAT facilities are an alternative, and more common way of providing many of the coverage benefits of large pages. BAT registers, which are set by the operating system, in contrast to TLB entries, which are typically reloaded by hardware, specify the translation for a block of storage which is large relative to a 4 KB page. Unlike TLB entries which typically translate a fixed-size block (a page) of storage, bits in the BAT registers allow a specification of a range roughly equivalent to 50–5000 (4 KB) pages. Both large pages and BAT blocks must be on a boundary similar to the size of the page or block in both address spaces (i.e., a 2 MB block must be on a 2 MB boundary). While large pages or large BAT blocks can alleviate the pressure for more TLB entries, the larger blocks of memory create operating system complexities and granularity issues that create great disadvantages for the memory mapping system. The major disadvantages of such large blocks are:

- When a BAT fault (i.e., a "page fault" for a portion of memory which will be covered by a BAT entry) is encountered, the faulting process is suspended until all data for the large block has been brought from disk to memory and the translation is made valid for the block. Longer waits are associated with larger blocks.
- While an entry is valid, all data must be present. Even if only a small portion of the data (or instructions) is needed, the entire block of main storage is allocated (and unavailable for other uses). Hardware complexity of BATs results in implementations with only a few BAT entries. In multi-user .systems with hundreds or thousands of processes and where memory is a limited resource, operating systems are reluctant to allocate large contiguous blocks of real memory to each user process. Therefore, it is expected that operating systems will not generally allow BAT entries (as currently defined) to be used for user data/instructions.
- It is difficult to provide coverage for areas which are not a power-of-two bytes because blocks must be stored on a power-of-two boundary. For example, to cover a 7 MB block, there are two choices: 1) Use an 8 MB entry and waste 1 MB of real storage. (This may not be permissible since the user can access storage beyond the expected 7 MB limit.), 2) Use three BAT entries (4 MB+2 MB+1 MB). This is a serious burden for current BAT hardware as most implementations have only a few (2–8) BAT entries.
- Variable sized blocks, as are used in BATs, require more advanced memory management techniques from the operating system than do uniform sized pages. When a BAT fault occurs, the operating system must find (or create) an available block of contiguous real storage for the entire block, a process that may require the removal of some blocks already in memory.
- Placing differing sized blocks in memory can leave fragments or splinters, i.e., small blocks of memory between other allocated blocks that are too small to be used by other blocks, creating inefficiency.

It can be seen that there is a need for a virtual memory mapping system that provides translation coverage for large blocks of storage, while still providing sufficiently fine granularity to improve data input/output (I/O) efficiency and reduce memory allocation problems. Such a virtual memory mapping system would dramatically increase the coverage of cached translation information while avoiding the problems associated with coarser granularity.

SUMMARY OF THE INVENTION

According to the present invention, a method and system for address translation mapping of logical partitions for address translation buffer entries in a data processing system is provided. The method comprises receiving a logical address for a memory reference to a selected logical partition of a plurality of logical partitions of a particular block of virtual memory, wherein the block of virtual memory is divided into the plurality of logical partitions, and wherein the logical address includes a plurality of logical partition selection bits selecting the selected logical partition from among the plurality of logical partitions. If the selected logical partition is valid in real memory, as indicated by a logical partition valid bit associated with the selected logical partition, a physical address for the memory reference in the selected logical partition is compiled from an entry of an address translation buffer that is associated with the particular block of virtual memory, wherein the logical partition valid bit is one of a plurality of logical partitions valid bits contained in the entry associated with the particular block of virtual memory, the plurality of logical partition valid bits being associated with the plurality of logical partitions. Thereafter, the memory reference within the selected logical partition is retrieved at the compiled physical address.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
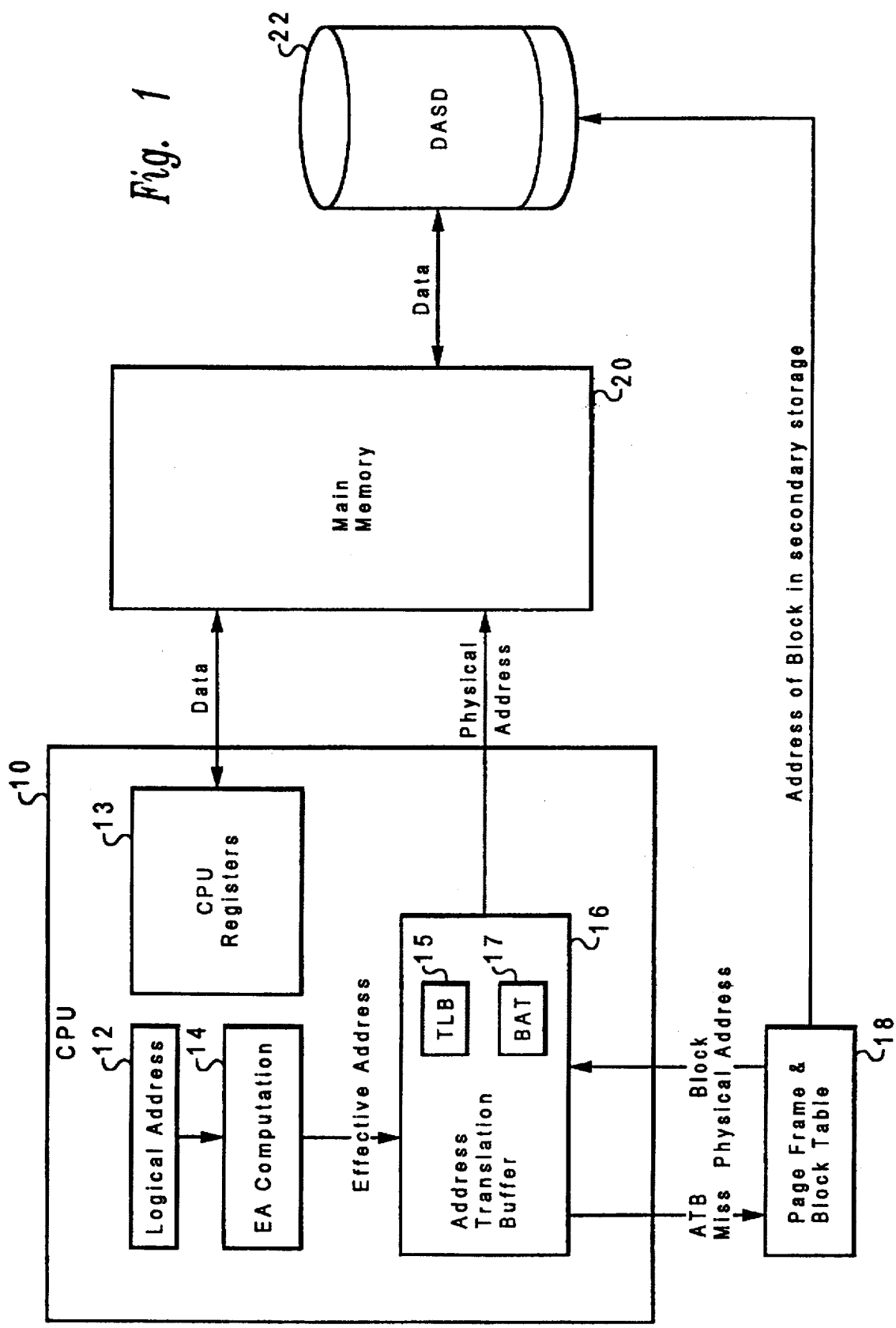
FIG. 1 depicts the virtual memory mapping system of a preferred embodiment of the present invention.

With reference now to the figures, and in particular with reference to FIG. 1, there is depicted the virtual memory mapping system of a preferred embodiment of the present invention. CPU 10 executes programs stored in the logical address space of direct access storage device (DASD) 22.

When an instruction executed in CPU 10 generates a memory reference to an instruction (or data) not contained within the CPU registers 13, the memory reference must be retrieved from the data processing system's memory hierarchy.

The instruction's logical address 12 addresses a block of memory within the logical address space of the virtual memory system. The block of memory addressed by the logical address is partitioned into a plurality of logical partitions. An effective address is computed from the logical address by the effective-address computation hardware 14. During program execution, the effective-address computation hardware 14 converts the instruction's address specifications into effective addresses. These are the addresses that the CPU uses when referencing an instruction or variable, and in general they agree with the compiler's logical address (as will be assumed herein).

CPU 10 sends the effective address to Address Translation Buffer (ATB) 16. Address Translation Buffer 16 contains TLB 15 and BAT 17. Both the TLB and the BAT are searched for an entry for that effective address. According to the present invention, a memory reference for a particular instruction may be to a selected logical partition of the block of virtual memory addressed by the logical address. A logical address includes a virtual block number addressing the block of memory in virtual memory space, a plurality of logical partition selection bits selecting a partition of the block of virtual memory, and a real address offset. In the present embodiment, only block entries of BAT 17 may be logically partitioned, but it will be understood by those skilled in the art that the present invention is applicable to any ATB entry, such as large page TLB entries. If Address Translation Buffer 16 has a valid entry for that effective address, it generates the corresponding physical address for the memory reference, which indicates the location of the memory reference within main memory 20. The physical address is transferred from Address Translation Buffer 16 to main memory 20, thereby accessing the memory reference in the physical address space and loading it from main memory 20 to CPU registers 13.

If Address Translation Buffer 16 has no entry for the effective address, the hardware (or software) consults the block (or page frame) table 18, using the virtual block number as an offset into the block table. (Although shown separately, block table 18 typically resides within main memory 20.) Block table 18 contains many more entries than Address Translation Buffer 16, but provides a much slower access time because it is contained in the slower main memory 20 and has a larger number of entries to search when making a comparison with the effective address. If the validity bit for the entry in the block table 18 corresponding to the virtual block number indicates the block is in memory, the hardware copies the block table entry into a new entry in the Address Translation Buffer 16 and uses the real (physical) block number in the block table entry to access the addressed data in main memory 20. Otherwise, the search of the block table for a memory reference to a block of memory that is not present in main memory 20 results in a block (or page) fault. A block fault is an exception that instructs the operating system to load into main memory the requested or demanded block and to update the block map (i.e., create an entry in the block table 18 and address translation buffer 16). The retrieved data is then loaded from main memory 20 to CPU 10 to satisfy the memory access.

As will be appreciated, the memory hierarchy shown in FIG. 1 may also include a cache memory between main memory 20 and CPU 10 that provides a high-speed RAM with a faster access time to hold the memory references most recently used. As will be appreciated, Address Translation Buffer 16 would make a request for the translated memory access to the cache memory, so that if the cache holds a copy of the requested data, the cache will quickly process the request. Otherwise, the cache forwards the request to main memory 20.

Figure 2:
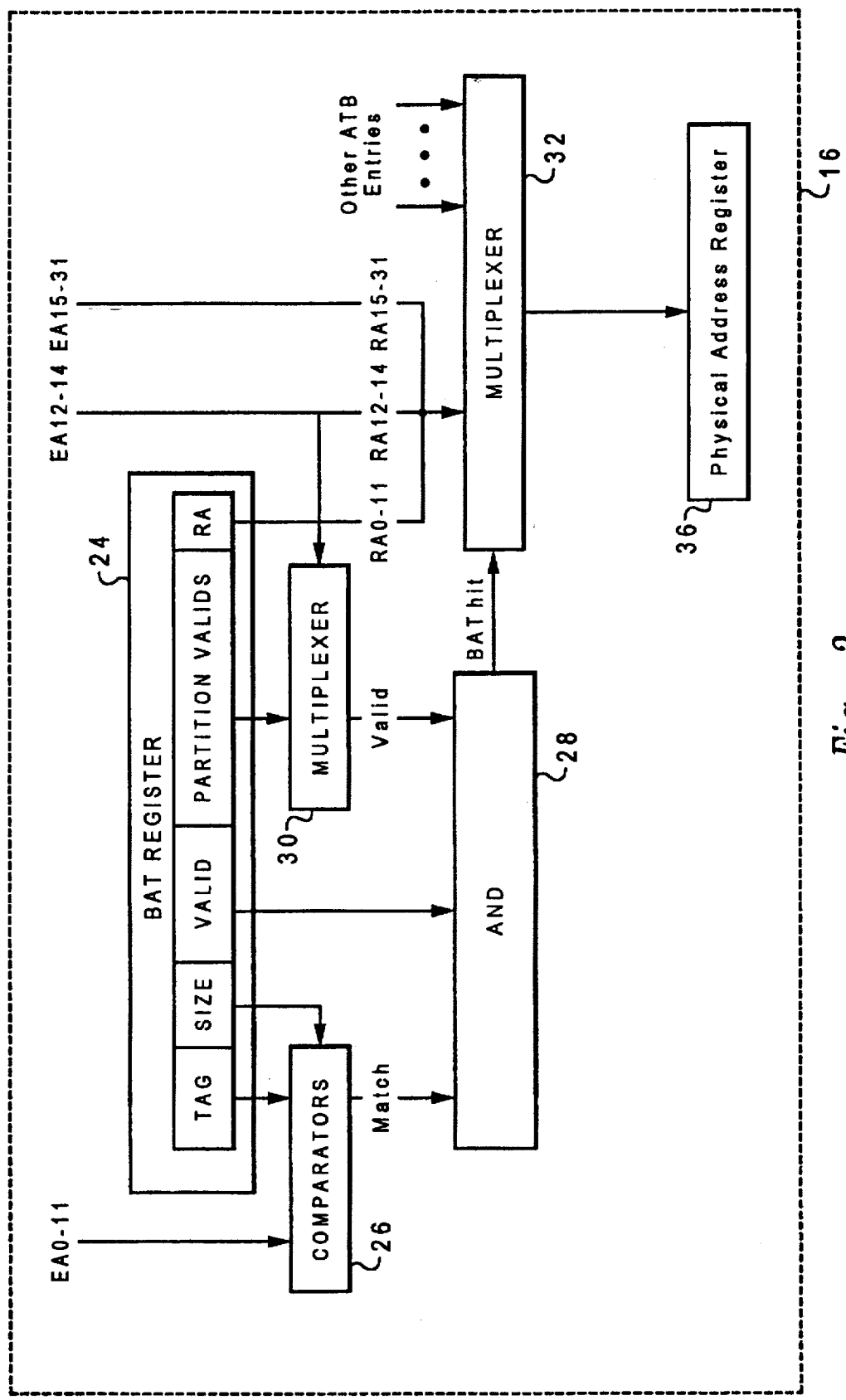
FIG. 2 shows a block diagram of an Address Translation Buffer, in accordance with a preferred embodiment of the present invention.

Referring now to FIG. 2, there is shown a block diagram of Address Translation Buffer 16, in accordance with a preferred embodiment of the present invention. Address Translation Buffer 16 has eight BAT registers. Each BAT register contains a BAT entry. As will be appreciated by those skilled in the art, the present invention is also applicable to large page TLB entries having partitioned pages and the operation of such an embodiment would be substantially similar to the present embodiment, except for the variable sized blocks for the BAT entries, and so such a description is not repeated herein. FIG. 2 shows a single ATB register 24 and associated hardware 26-36. TLB 15 and the remaining seven ATB registers and associated hardware of Address Translation Buffer 16 are not shown. As will be appreciated, Address Translation Buffer 16 can be equipped to provide address translation caching for any number of entries, including eight, for a preferred embodiment.

As shown in FIG. 2, each BAT entry of Address Translation Buffer 16 contains a block Valid bit, block Size, effective address (TAG), real address (RA), and a plurality of partition valid bits (Partition Valids). The block Valid bit specifies whether the contents of the BAT register represent a valid address translation for the referenced block of memory. If the block of memory referenced by the TAG in the entry is stored in main memory at the real address (RA), the block valid bit is set. The block Size is an encoding of the size, in bytes, of the block of memory translated by the current entry. While the implemented TAG and RA fields need a sufficient amount of bits to handle the smallest allowable block, the number of bits used for a given translation is determined by the block size. For a block size of $2^N$ bytes, the TAG field contains the address of the first byte of the block in the effective/virtual address space (i.e., the virtual block number) for the translated block of memory, with the low-order N address bits removed. The RA field contains the address of the first byte of the block in the real address space of the main memory (i.e., the real block number), with the low-order N address bits removed. Although the Address Translation Buffer supports multiple-size blocks, in the preferred embodiment, a 1 MB BAT block size is assumed.

In a preferred embodiment, the ATB entry has eight partition valid bits, each corresponding to one of eight separate partitions of the 1 MB block of virtual memory translated by the particular ATB entry. Each partition bit is set when its corresponding partition of the block of memory is stored in the main memory. In accordance with the present invention, a memory reference to a particular partition of a block of virtual memory will only result in the particular partition of the block of memory being stored to main memory. If a valid partition is stored in main memory, its corresponding partition valid bit in the partition Valids field of the ATB entry is set. If that partition becomes invalid or is overwritten, the corresponding partition valid bit is reset.

As seen in FIG. 2, an untranslated effective address EA0-31 is presented to ATB 16. This untranslated effective address is simultaneously presented to all (appropriate) ATB entries in the ATB 16. In this embodiment, the effective and real addresses for a block of memory are 32-bit addresses. The upper twelve bits (EA 0-11), which specify a 1 MB block, of the effective address are compared by comparators 26 to the upper effective address bits (TAG 0–11) for the block corresponding to this ATB entry. If these addresses match, an indication is output to AND gate 28, which forms the last stage of the tag-comparison function. The low-order effective address bits (FA 12–31 in the case of the 1 MB block) pass to multiplexer 32 unmodified to become real address bits RA 12–31.

Simultaneously, a valid bit from the eight partition valid bits (Partition Valids) is selected to determine if the block of memory referenced by the effective address is valid in the main memory. The high-order effective address bits within the block (i.e., the high-order bits addressing a particular partition within the block of memory corresponding to the ATB entry) are used to select the partition and its valid bit within the partition valid bits. Within the 1 MB block addressed by the first twelve effective address bits, the high-order effective address bits EA 12–14 select a particular partition of the eight partitions of the block. The eight partition valid bits are input into multiplexer 30 and the high-order effective address bits EA 12–14 are used to index the selected partition valid bit as an output from multiplexer 30. The output of multiplexer 30 is input into ANDgate 28 as another input into the last stage of the tag comparison function, as will be understood by those skilled in the art.

If there has been a match of the virtual block number for the received logical address and the virtual block number stored in register 24, and further, if the logical partition selection bits in the received logical address indicate a valid partition in main memory, as indicated by the selected partition bit in the ATB entry, the output of ANDgate 28 is set, indicating an ATB hit. All ATB registers are connected to multiplexer 32. The ATB hit for this ATB register selects the two address inputs (RA12–14 and 15–31) and the RA field (RA 0–11) for this entry in multiplexer 32. These selected address bits are output to physical address register 36, which stores the real block number (RA 0–11), the logical partition selection bits (RA 12–14), and the real address offset (RA 15–31). The contents of physical address register 36 are concatenated to form the physical address that is transferred to the main memory to access the selected partition of the memory reference. If no BAT or TLB entry produces an ATB hit signal, an ATB fault occurs.

As will be appreciated by those skilled in the art, the logical partition selections bits within the effective address will vary depending upon the number of partitions for the block of memory and the block size. Further, the operating system will set the fields of the ATB entry when loaded as required by the block size. Thus, the appropriate high-order effective address bits, as a function of the block size, are input into comparators 26 upon the receipt of a memory reference. Also, the appropriate logical partition selection bits of a received effective address, as a function of the block size, are used to provide the appropriate control of multiplexer 30. In addition, the selection of the referenced partition's valid bit by multiplexer 30 is an operation that can be overlapped with the existing and relatively lengthy TAG comparison. The selection of a partition, as opposed to a block, requires no additional time to generate the RA fields and the ATB hit signal, since the Andgate 28 can be implemented as one additional bit in the comparators 26.

As can be seen, the present invention provides a method and system for refining the granularity of a large block of memory by introducing logical partitions of the block and associating a valid bit with each partition. As memory references are satisfied, the system validates partitions, rather than an entire ATB entry. If a new ATB entry must be created within Address Translation Buffer 16 to satisfy a fault (i.e., the initial fault for the block), the partition will be backed by real storage in the main memory and an ATB entry is created with only the one valid bit corresponding to the particular selected partition of the block set. If the corresponding ATB entry already existed when the fault occurs (i.e., subsequent faults for the block), the faulting partition would simply be backed up by real storage in the main memory and the partition's valid bit would be set in the ATB entry. For additional performance, the operating system may chose to fetch-ahead additional partitions of the block simultaneously with, or after the immediate memory reference.

As will be appreciated by those skilled in the art, significant advantages are created by the present invention's method and system of introducing logical partitions for a ATB entry. First, the logical partitioning of the address translation mapping can be provided in either existing BAT or TLB technologies. Additionally, the response time of I/O for a fault is decreased because only a subset, a single partition, of the block is required. The faulting process may thus resume after a portion of the data (or instructions) has been retrieved, rather than waiting for the entire block covered by the ATB entry. Further, the amount of contiguous real storage required to immediately satisfy a ATB fault is reduced to the size of the partition. Additionally, the real storage associated with non-valid partitions can be made available to other processes until needed by the process. If the other portions of the block are not accessed during some interval, additional savings may result by eliminating unnecessary I/O. Still further, because the granularity of real memory which must be reserved for a particular memory access is reduced, address translation caching of user address space is more acceptable to the system. Last, the present invention much more efficiently accommodates memory references to blocks of memory which are not a power-of-two in size (such as 3 MB or 5 MB). Because the present invention requires that only selected partitions be stored at a real address in main memory, the entire non-power-of-two block is not required to be saved in main memory. Therefore, only a single ATB entry is required for this particular memory reference, and further, an entire power-of-two block of main memory does not have to be reserved for this ATB entry.

Although the present invention has been described in terms of 32-bit address spaces, it is equally applicable to other sizes, such as 64-bit addresses. Moreover, although this invention has been described in terms of eight partitions, it is equally applicable to other sizes, such as two or four partitions. Moreover, the present invention is equally applicable to TLB or BAT facilities. As will be appreciated, the operating system would need to support the logical partitioning as used in the present invention. Exploiting the features and advantages of the present invention requires that the operating system perform the manipulations of the logical partition selection bits in the ATB entry and allow for additional ATB faults for partitions that are not yet valid. While the invention has been particularly shown and described with reference to a preferred embodiment, it will be understood by those skilled in the art that various changes in form and detail may be made therein without departing from the spirit and scope of the invention.

What is claimed is:

1. A method for address translation mapping of logical partitions for address translation buffer entries in a data processing system, the method comprising the steps of:

receiving a logical address for a memory reference to a selected logical partition among a plurality of logical partitions of a particular block of virtual memory, wherein the block of virtual memory is divided into the plurality of logical partitions, and wherein the logical address includes a plurality of logical partition selection bits selecting the selected logical partition from among the plurality of logical partitions;

if the selected logical partition is valid in real memory, as indicated by a logical partition valid bit associated with the selected logical partition, compiling a physical address for the memory reference in the selected logical partition from an entry of an address translation buffer that is associated with the particular block of virtual memory regardless of whether logical partitions of said particular block other than said selected logical partition are valid within said real memory, wherein the logical partition valid bit is one of a plurality of logical partitions valid bits contained in the entry associated with the particular block of virtual memory, the plurality of logical partition valid bits each being associated with a respective one of the plurality of logical partitions; and retrieving the memory reference within the selected logical partition at the compiled physical address.

2. A method for address translation mapping of logical partitions for address translation buffer entries in a data processing system according to claim 1, wherein a logical address includes a virtual block number for the particular block of virtual memory, and wherein each entry includes a virtual block number for an associated block of memory and a real block number addressing the associated block in real memory, and wherein an entry is associated with a particular block of virtual memory when the virtual block number for the particular block of virtual memory and the virtual block number for the entry are equal.

3. A method for address translation mapping of logical partitions for address translation buffer entries in a data processing system according to claim 1, wherein the step of compiling comprises concatenating the real block number with the logical partition selection bits and a real address offset to form a physical address.

4. A method for address translation mapping of logical partitions for address translation buffer entries in a data processing system according to claim 1, further comprising the steps of:

if said plurality of logical partition valid bits indicate that none of said plurality of logical partitions of said particular block of virtual memory is valid within said real memory, storing into the real memory the selected logical partition for the received logical address, and creating an entry in the address translation buffer for the particular block of memory addressed by the received logical address.

5. A method for address translation mapping of logical partitions for address translation buffer entries in a data processing system according to claim 1, further comprising the steps of:

if said plurality of logical partition valid bits indicate that at least one logical partition of said particular block other than said selected logical partition is valid within the real memory, storing into the real memory the selected logical partition addressed by the received logical address, and updating the plurality of logical partition valid bits in the entry corresponding to the particular block of memory to indicate that the selected logical partition is contained in the real memory.

6. A method for address translation mapping of logical partitions for address translation buffer entries in a data processing system according to claim 4, and further comprising the step of accessing said selected logical partition in the real memory prior to storing, into said real memory, another of said plurality of logical partitions in the block of memory addressed by the received logical address.

7. A system for address translation mapping of logical partitions for address translation buffer entries in a data processing system, said system comprising:

means for receiving a logical address for a memory reference to a selected logical partition among a plurality of logical partitions of a particular block of virtual memory, wherein the block of virtual memory is divided into the plurality of logical partitions, and wherein the logical address includes a plurality of logical partition selection bits selecting the selected logical partition from among the plurality of logical partitions;

means, responsive to the selected logical partition being valid in real memory, as indicated by a logical partition valid bit associated with the selected logical partition, for compiling a physical address for the memory reference in the selected logical partition from an entry of an address translation buffer that is associated with the particular block of virtual memory regardless of whether logical partitions of said particular block other than said selected logical partition are valid within said real memory, wherein the logical partition valid bit is one of a plurality of logical partitions valid bits contained in the entry associated with the particular block of virtual memory that are each associated with a respective one of the plurality of logical partitions; and means for retrieving the memory reference within the selected logical partition at the compiled physical address.

8. A system for address translation mapping of logical partitions for address translation buffer entries in a data processing system according to claim 7, wherein a logical address includes a virtual block number for the particular block of virtual memory, and wherein each entry includes a virtual block number for an associated block of memory and a real block number addressing the associated block in real memory, and wherein an entry is associated with a particular block of virtual memory when the virtual block number for the particular block of virtual memory and the virtual block number for the entry are equal.

9. A system for address translation mapping of logical partitions for address translation buffer entries in a data processing system according to claim 7, wherein the means for compiling comprises means for concatenating the real 4 block number with the logical partition selection bits and a real address offset to form a physical address.

10. A system for address translation mapping of logical partitions for address translation buffer entries in a data processing system according to claim 7, further comprising means, responsive to said plurality of logical partition valid bits indicating that none of said plurality of logical partition of said particular block is valid within the real memory, for storing into the real memory the selected logical partition for the received logical address, and creating an entry in the address translation buffer for the block of memory addressed by the received logical address.

11. A system for address translation mapping of logical partitions for address translation buffer entries in a data processing system according to claim 7, further comprising means, responsive to said .plurality of logical partition valid bits indicating that at least one logical partition of said particular block other than said selected logical partition is valid within the real memory, for storing into the real memory the selected logical partition addressed by the received logical address, and updating the plurality of logical partition valid bits in the entry corresponding to the block of memory addressed by the received logical address to indicate that the selected logical partition is contained in the real memory.

12. A system for address translation mapping of logical partitions for address translation buffer entries in a data processing system according to claim 7, said system further comprising means for accessing said selected logical partition in the real memory prior to storing, into said real memory, another of said plurality of logical partitions in the block of memory addressed by the received logical address.

13. A method for address translation mapping of logical partitions for address translation buffer entries in a data processing system, the method comprising the steps of:

receiving a logical address for a memory reference to a selected logical partition of a particular block of virtual memory, wherein the particular block of virtual memory is divided into a plurality of logical partitions, and wherein a logical address includes a virtual block number addressing the block of memory in virtual memory space, a plurality of logical partition selection bits selecting the selected logical partition within the block of memory, and a real address offset;

determining if there is a match between the virtual block number of the received logical address and a virtual block number for any entry in an address translation buffer, wherein each entry in the address translation buffer is associated with a block of virtual memory and includes a virtual block number, a real block number addressing the block of memory in real memory, and a plurality of logical partition valid bits, wherein a logical partition of the block of virtual memory is indicated as valid in real memory by an associated logical partition valid bit [of]among the plurality of logical partition valid bits; and if there is a match of the virtual block numbers for the received logical address and an entry in the address translation buffer and if the selected logical partition is indicated as valid by the associated logical partition valid bit, combining the real block number with the logical partition selection bits and the real address offset to form a physical address in real memory for the memory reference in the selected logical partition, regardless of whether logical partitions of said particular block other than said selected logical partition are valid within said real memory.

14. A method for address translation mapping of logical partitions for address translation buffer entries in a data processing system according to claim 13, further comprising the step of retrieving the memory reference in the selected logical partition addressed by the formed physical address.

15. A method for address translation mapping of logical partitions for address translation buffer entries in a data processing system according to claim 13, if there is not a match of the virtual block number of the received logical address and the virtual block number of any entry in the address translation buffer, further comprising the steps of storing into the real memory the selected logical partition for the received logical address, and creating an entry in the address translation buffer for the block of memory addressed by the received logical address with the associated partition valid bit being set.

16. A method for address translation mapping of logical partitions for address translation buffer entries in a data processing system according to claim 13, when the selected logical partition is not indicated as valid in an entry having a match with the virtual block number of the received logical address, further comprising the steps of storing into the real memory the block of memory addressed by the received logical address, and updating the plurality of logical partition valid bits in the entry corresponding to the block of memory addressed by the received logical address to indicate that the selected logical partition is contained in the real memory.

17. A method for address translation mapping of logical partitions for address translation buffer entries in a data processing system according to claim 13, wherein the step of combining is performed by concatenating the real block number with the plurality of logical partition selection bits and a real address offset to form a physical address for the selected partition of the memory reference.

18. A virtual memory mapping system for translating a logical address for a memory reference to a block of virtual memory into a physical address for the memory reference in real memory, wherein the block of virtual memory is divided into a plurality of logical partitions, and wherein a logical address includes a virtual block number addressing the block of memory in virtual memory space, a plurality of logical partition selection bits selecting the selected logical partition within the block of memory, and a real address offset, the virtual memory mapping system comprising:

an address translation buffer containing a plurality of entries, wherein each entry in the address translation buffer is associated with a block of virtual memory and includes a virtual block number, a real block number addressing the block of memory in real memory, and a plurality of logical partition valid bits, wherein a logical partition of the block of virtual memory is indicated as valid in real memory by an associated logical partition valid bit among the plurality of logical partition valid bits;

means for combining the real block number with the logical partition selection bits and the real address offset to form a physical address in real memory for the memory reference in the selected logical partition, when the selected logical partition is indicated as valid by the associated logical partition valid bit;

a comparator that receives a logical address for a memory reference to a selected logical partition of a block of virtual memory and determines if there is a match between the virtual block number of the received logical address and a virtual block number for any entry in the address translation buffer;

selection means for selecting the logical partition valid bit associated with the selected logical partition; and a physical address register that receives and stores the real block number, the logical partition selection bits and the real address offset as a physical address to the real memory for the memory reference, when the logical partition valid bit associated with the selected logical partition indicates the selected partition is valid in real memory regardless of whether logical partitions of said particular block other than said selected logical partition are valid within said real memory.

19. A virtual memory mapping system according to claim 18, further comprising a main memory that outputs the memory reference in the selected logical partition addressed by the formed physical address.

20. A virtual memory mapping system according to claim 18, further comprising a main memory capable of storing the selected partition of the block of memory addressed by the received logical address, and wherein the address translation buffer creates an entry for the block of memory addressed by the received logical address, when the comparator determines there is not a match of the virtual block number of the received logical address and the virtual block number of any entry in the address translation buffer.

21. A virtual memory mapping system according to claim 18, further comprising a main memory capable of storing the block of memory addressed by the received logical address, and wherein the address translation buffer updates the plurality of logical partition valid bits in the entry corresponding to the block of memory addressed by the received logical address to indicate that the selected logical partition of the block of memory is contained in real memory, when the selected logical partition is not indicated as valid in an entry having a match with the virtual block number of the received logical address.

22. A virtual memory mapping system according to claim 18, wherein the physical address register concatenates the real block number with the plurality of logical partition selection bits and a real address offset to form a physical address for the selected partition of the memory reference.

* * * * *

UNITED STATES PATENT AND TRADEMARK OFFICE
CERTIFICATE OF CORRECTION

PATENT NO. : 5,708,790
DATED : Jan. 13, 1998
INVENTOR(S) : *Steven W. White et al.*

It is certified that error appears in the above-indentified patent and that said Letters Patent is hereby corrected as shown below:

In col. 10, line 49, please delete the number "4" following "real".

In col. 11, line 37, please delete "[of]" following "bit".

Signed and Sealed this

Twenty-first Day of July, 1998

*Attest:*

BRUCE LEHMAN

*Attesting Officer*     Commissioner of Patents and Trademarks